United States Patent
Rahman et al.

(10) Patent No.: US 10,686,266 B2
(45) Date of Patent: Jun. 16, 2020

(54) CAM DRIVEN, SPRING LOADED GROUNDING CLAMP

(71) Applicant: HONEYWELL INTERNATIONAL INC., Morris Plains, NJ (US)

(72) Inventors: Ataur Rahman, Morris Plains, NJ (US); Ravi Kumar Avupati, Morris Plains, NJ (US); Ranjith R, Morris Plains, NJ (US); Mehabube Rabbanee Shaik, Morris Plains, NJ (US); Linda Ziegler-Robinson, Morris Plains, NJ (US); Tim Jansen, Morris Plains, NJ (US); Rizwan Ahmad, Morris Plains, NJ (US)

(73) Assignee: Honeywell International Inc., Morris Plains, NJ (US)

( * ) Notice: Subject to any disclaimer, the term of this patent is extended or adjusted under 35 U.S.C. 154(b) by 0 days.

(21) Appl. No.: 16/328,854

(22) PCT Filed: Aug. 26, 2017

(86) PCT No.: PCT/US2017/048781
§ 371 (c)(1),
(2) Date: Feb. 27, 2019

(87) PCT Pub. No.: WO2018/044745
PCT Pub. Date: Mar. 8, 2018

(65) Prior Publication Data
US 2019/0190171 A1  Jun. 20, 2019

(30) Foreign Application Priority Data

Aug. 30, 2016 (IN) .............................. 201611029562
Nov. 29, 2016 (IN) .............................. 201611040777

(51) Int. Cl.
*H01R 11/15* (2006.01)
*H01R 4/52* (2006.01)
(Continued)

(52) U.S. Cl.
CPC ............ *H01R 11/15* (2013.01); *H01R 4/5008* (2013.01); *H01R 4/52* (2013.01); *H01R 11/14* (2013.01); *H01R 4/66* (2013.01); *H02G 7/00* (2013.01)

(58) Field of Classification Search
CPC .......... H01R 11/15; H01R 4/42; H01R 11/14; H01R 4/38
See application file for complete search history.

(56) References Cited

U.S. PATENT DOCUMENTS 150,900 A  *  5/1874  Silver ..................... B25B 1/125
                                                269/182
1,244,339 A  * 10/1917  Johnson, Jr. ........... H01R 11/14
                                                439/477
(Continued)

FOREIGN PATENT DOCUMENTS

KR    10-1329996 B1    11/2013

OTHER PUBLICATIONS

International Search Report and Written Opinion for Application No. PCT/US2017/048781 dated Dec. 4, 2017, 12 pages.

*Primary Examiner* — Ross N Gushi
(74) *Attorney, Agent, or Firm* — Alston & Bird LLP

(57) ABSTRACT

A grounding clamp (10, 210) is provided for use with an overhead electrical conductor (12) and is operated by a user via a shotgun stick or other elongate stick or pole. The grounding damp (10) includes a pair of damp jaws (16, 18; 216,218) that, in one embodiment (10), are biased towards a closed position by at least one spring (20,22) and that are driven between open and closed positions via a cam mecha- (Continued)

nism (24) in response to the user applying a torque force to the clamp (10) with the shotgun stick or other elongate stick or pole. In another embodiment, a ground clamp (210) includes a tightening mechanism (220) configured to tighten a pair of jaws (216,218), and a ratchet mechanism (222) configured to allow the tightening mechanism (220) to be translated relative to the jaw (216) to any of a plurality of predetermined, linearly spaced, fixed positions to adjust the spacing between the jaws (216,218).

14 Claims, 11 Drawing Sheets

(51) Int. Cl.
  *H01R 11/14* (2006.01)
  *H01R 4/50* (2006.01)
  *H01R 4/66* (2006.01)
  *H02G 7/00* (2006.01)

(56) References Cited

U.S. PATENT DOCUMENTS

| | | | | |
|---|---|---|---|---|
| 1,549,567 A | * | 8/1925 | Baldwin | B25B 5/101 269/221 |
| 1,749,491 A | * | 3/1930 | Kokay | B25B 5/101 269/215 |
| 2,016,749 A | * | 10/1935 | Mack | H01R 11/15 81/53.1 |
| 2,102,602 A | * | 12/1937 | Nash | B25B 1/125 269/181 |
| 2,107,061 A | * | 2/1938 | Pittman | H01R 4/62 439/803 |
| 2,120,447 A | * | 6/1938 | Tipsord | H01R 11/15 439/803 |
| 2,304,807 A | * | 12/1942 | Donoghue | H01R 11/15 439/803 |
| 2,352,686 A | * | 7/1944 | Broadbooks | H01R 11/14 81/53.1 |
| D143,096 S | * | 12/1945 | Sasgen | D8/73 |
| 2,408,801 A | * | 10/1946 | Miller | B25B 5/101 269/215 |
| 2,448,402 A | * | 8/1948 | Thompson | H01R 11/15 439/803 |
| 2,461,687 A | * | 2/1949 | Hopfeld | B23K 37/0435 439/803 |
| 2,463,263 A | * | 3/1949 | Gordon | B25B 5/101 74/424.78 |
| 2,506,010 A | * | 5/1950 | Birkenmaier | H01R 11/15 439/803 |
| 2,671,482 A | * | 3/1954 | Gordon | B25B 1/125 269/182 |
| 2,705,983 A | * | 4/1955 | Guadagna | B25B 5/101 269/174 |
| 2,768,664 A | * | 10/1956 | Morgan | B25B 5/10 269/203 |
| 2,966,817 A | * | 1/1961 | Wengen | H01R 11/14 81/53.1 |
| 3,036,286 A | * | 5/1962 | Gorc | H01R 11/15 439/479 |
| 3,066,931 A | * | 12/1962 | Beals | B25B 1/125 269/173 |
| 3,097,037 A | * | 7/1963 | Gainer | H01R 11/15 439/777 |
| 3,177,459 A | * | 4/1965 | Toedtman | H01R 11/15 439/479 |
| 3,323,083 A | * | 5/1967 | Ziegler, Jr. | H01R 24/44 333/260 |
| 3,599,960 A | * | 8/1971 | Phillips | B25B 5/101 269/182 |
| 3,624,592 A | * | 11/1971 | Walter | H01R 11/14 439/477 |
| 3,753,442 A | * | 8/1973 | Tauber | F16K 5/0647 137/15.17 |
| 3,892,458 A | * | 7/1975 | Clark | H01R 13/623 439/319 |
| 3,901,574 A | * | 8/1975 | Paullus | H01R 13/623 439/315 |
| 3,923,363 A | * | 12/1975 | Kraft | H01R 4/2408 439/413 |
| 4,023,431 A | * | 5/1977 | Pavlas | F16K 31/143 74/424.94 |
| 4,097,108 A | * | 6/1978 | Prodel | H01R 11/15 411/4 |
| 4,220,322 A | * | 9/1980 | Hobday | B25B 5/067 269/214 |
| 4,305,180 A | * | 12/1981 | Schwartz | F16B 21/04 439/296 |
| 4,361,374 A | * | 11/1982 | Marmillion | F16B 21/04 439/314 |
| 4,569,510 A | * | 2/1986 | Haramoto | B25B 1/125 269/181 |
| 4,582,307 A | * | 4/1986 | Wang | B25B 5/101 269/182 |
| 4,846,725 A | * | 7/1989 | Williams | H01R 11/15 439/479 |
| 4,895,530 A | * | 1/1990 | Gugelmeyer | H01R 13/623 439/311 |
| 4,911,572 A | * | 3/1990 | Williams | H01R 4/38 403/209 |
| 4,912,949 A | * | 4/1990 | Bowers | B25B 5/101 269/249 |
| 5,085,583 A | * | 2/1992 | Amos | H01R 11/15 439/479 |
| 5,217,213 A | * | 6/1993 | Lii | B25B 5/06 269/6 |
| 5,256,077 A | * | 10/1993 | Mattingly | H01R 13/625 285/396 |
| 5,383,272 A | * | 1/1995 | Mattingly | H01R 13/625 29/876 |
| 5,423,525 A | * | 6/1995 | Spainhower | B25B 1/125 269/174 |
| 5,547,404 A | * | 8/1996 | Nellis, Jr. | H01R 4/366 439/786 |
| 5,556,299 A | * | 9/1996 | Finke | H01R 11/15 439/479 |
| 5,627,448 A | * | 5/1997 | Okada | B60L 3/12 439/133 |
| 5,913,509 A | * | 6/1999 | Price | B25B 5/068 269/246 |
| 5,941,152 A | * | 8/1999 | Kim | B23D 47/04 83/464 |
| 6,089,556 A | * | 7/2000 | Whiteford | B25B 1/12 269/143 |
| 6,096,970 A | * | 8/2000 | Katoh | H02G 7/053 174/40 CC |
| 6,250,621 B1 | * | 6/2001 | Ping | B25B 5/10 269/181 |
| 6,297,741 B1 | * | 10/2001 | Higgins | F15B 21/041 340/631 |
| 6,336,822 B1 | * | 1/2002 | Luzzoli | H01R 13/625 439/314 |
| 6,354,580 B1 | * | 3/2002 | Nagai | B25B 5/12 269/225 |
| 6,364,681 B1 | * | 4/2002 | Watanabe | H01R 13/625 439/335 |
| 6,367,787 B1 | * | 4/2002 | Poole | B25B 5/068 269/166 |
| 6,474,632 B1 | * | 11/2002 | Liou | B25B 5/068 269/170 |
| 6,568,949 B1 | * | 5/2003 | Walters | H01R 13/5202 439/319 |
| 6,585,243 B1 | * | 7/2003 | Li | B25B 5/068 269/171.5 |
| 6,626,699 B1 | * | 9/2003 | Epe | H01R 13/625 439/311 |
| 6,648,315 B1 | * | 11/2003 | Lee | B25B 5/068 269/166 |

(56) References Cited

U.S. PATENT DOCUMENTS

| | | | | |
|---|---|---|---|---|
| 6,685,493 B2 * | 2/2004 | Birkenmaier | H01R 13/625 | 439/314 |
| 6,891,106 B2 * | 5/2005 | Sumner | H01R 11/15 | 174/78 |
| 7,029,316 B2 * | 4/2006 | Jackson, III | H01R 11/12 | 174/40 R |
| 7,036,807 B1 * | 5/2006 | Gasparyan | B25B 1/125 | 269/181 |
| 7,052,334 B1 * | 5/2006 | Cabay | F16B 39/04 | 411/326 |
| 7,104,826 B2 * | 9/2006 | Zahlit | H01R 13/625 | 439/314 |
| 7,156,692 B2 * | 1/2007 | Jackson, III | H01R 11/15 | 174/40 R |
| 7,160,142 B2 * | 1/2007 | Hughes | H01R 11/14 | 439/478 |
| 7,172,183 B1 * | 2/2007 | Yang | B25B 5/068 | 269/3 |
| 7,815,175 B2 * | 10/2010 | Cicenas | B25B 5/068 | 269/3 |
| 7,837,491 B2 * | 11/2010 | Collin | H01R 13/62966 | 439/317 |
| 7,988,479 B2 * | 8/2011 | Hankins | H01R 13/625 | 439/314 |
| 8,025,279 B2 * | 9/2011 | Seber | B25B 5/101 | 269/143 |
| 8,056,445 B2 * | 11/2011 | Jackson, III | B25B 13/5091 | 81/487 |
| 8,485,073 B1 * | 7/2013 | Lopez | B25B 5/04 | 81/129.5 |
| 8,512,070 B2 * | 8/2013 | De France | H01R 4/38 | 439/479 |
| 8,517,776 B1 * | 8/2013 | Flojo | H01R 4/646 | 439/108 |
| 8,590,871 B2 * | 11/2013 | Geier | B25B 5/068 | 269/3 |
| 8,651,891 B2 * | 2/2014 | Balfour | H01R 4/489 | 439/479 |
| 8,672,716 B2 * | 3/2014 | De France | H01R 4/42 | 439/803 |
| 8,783,416 B2 * | 7/2014 | Singleton | B61K 3/00 | 184/3.1 |
| 8,864,504 B1 | 10/2014 | Gretz | | |
| 9,144,890 B2 * | 9/2015 | Chen | B25B 5/085 | |
| 9,168,641 B2 * | 10/2015 | Chen | B25B 5/068 | |
| 9,698,502 B2 * | 7/2017 | Tatzel | H01R 13/623 | |
| 9,812,794 B2 * | 11/2017 | Cawood | H01R 4/42 | |
| 9,849,568 B2 * | 12/2017 | Kaiser | B29C 33/424 | |
| 10,095,001 B2 * | 10/2018 | Sakmar | H02G 3/32 | |
| 10,122,101 B2 * | 11/2018 | Rahman | H01R 11/15 | |
| 10,128,582 B2 * | 11/2018 | Diop | H01R 4/4872 | |
| 10,144,276 B2 * | 12/2018 | Facchinello | B60J 7/198 | |
| 10,164,356 B2 * | 12/2018 | Diop | H01R 4/12 | |
| 10,193,246 B1 * | 1/2019 | White | H01R 11/14 | |
| 10,230,181 B2 * | 3/2019 | Krueger | H01R 4/64 | |
| 10,283,882 B2 * | 5/2019 | Quaedvlieg | H02G 1/02 | |
| 10,361,493 B2 * | 7/2019 | De France | H01R 11/15 | |
| 2002/0177353 A1 * | 11/2002 | De France | H01R 11/15 | 439/477 |
| 2003/0129870 A1 * | 7/2003 | Norwood | H01R 24/40 | 439/311 |
| 2006/0043660 A1 * | 3/2006 | Ping | B25B 5/068 | 269/6 |
| 2006/0189203 A1 | 8/2006 | Jackson, III | | |
| 2008/0136077 A1 * | 6/2008 | Yang | B25B 5/068 | 269/6 |
| 2011/0081810 A1 | 4/2011 | Flojo | | |
| 2018/0115090 A1 * | 4/2018 | Rahman | H01R 11/15 | |
| 2019/0190171 A1 * | 6/2019 | Rahman | H01R 4/52 | |

* cited by examiner

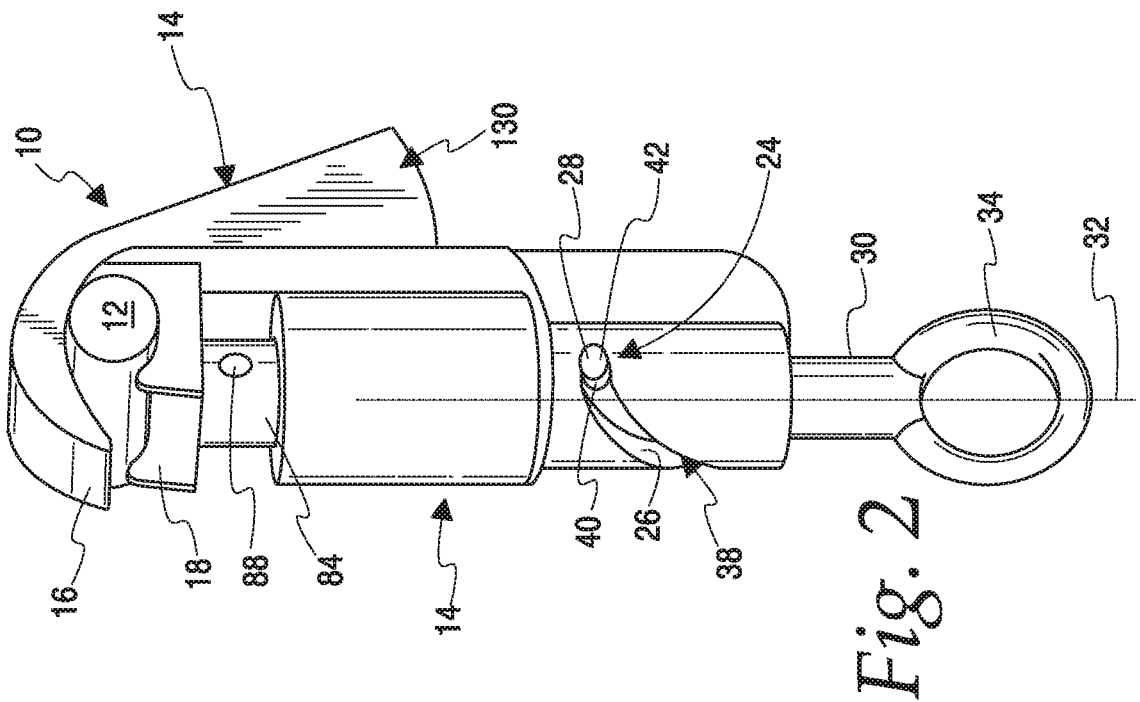
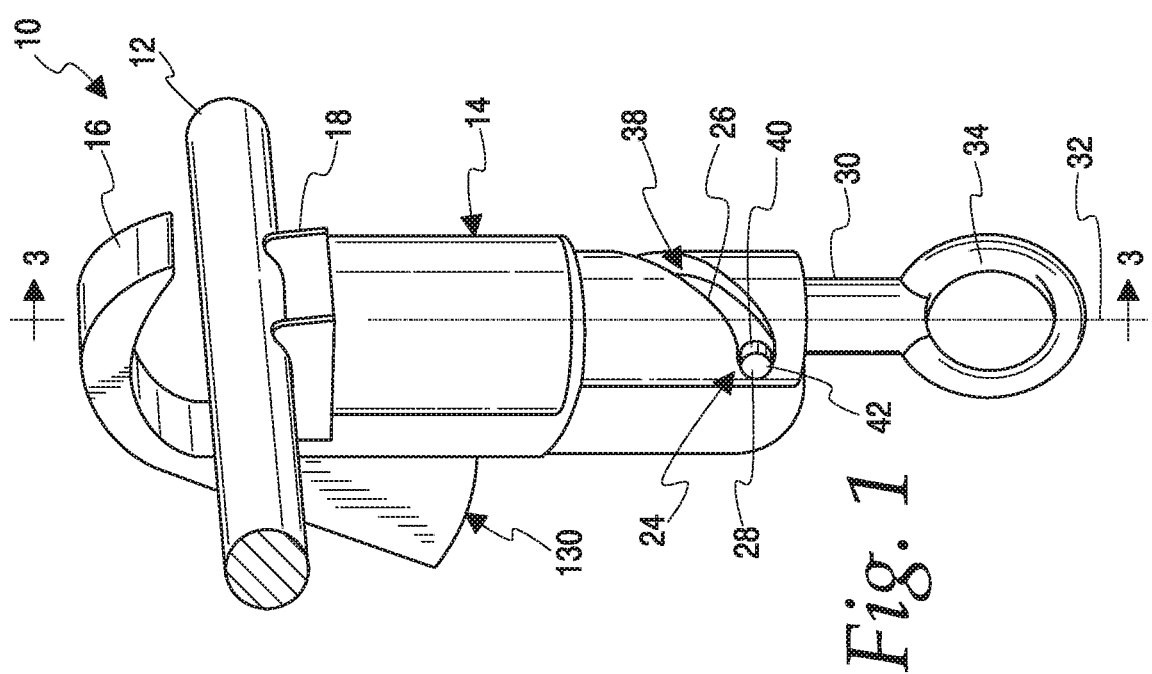

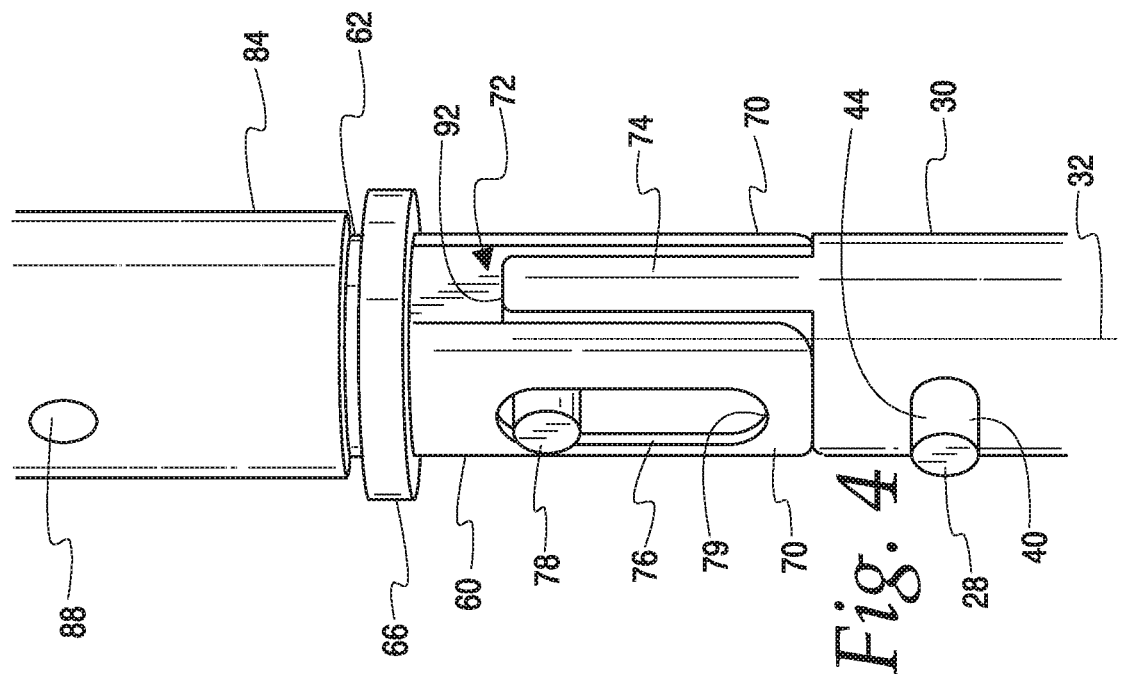
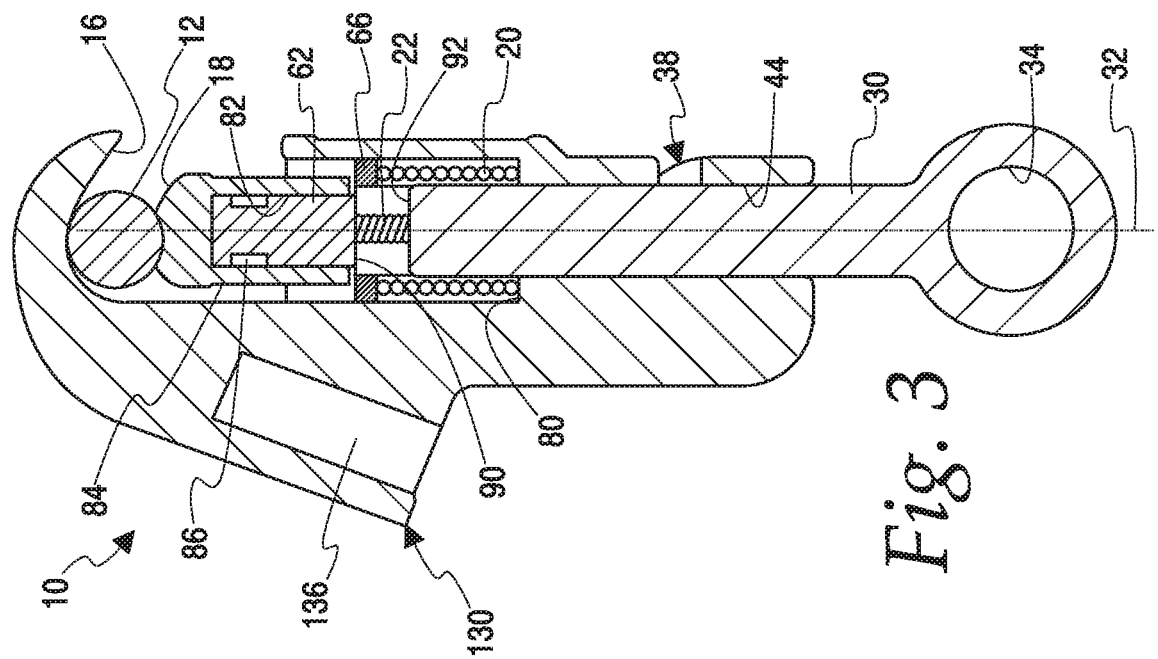

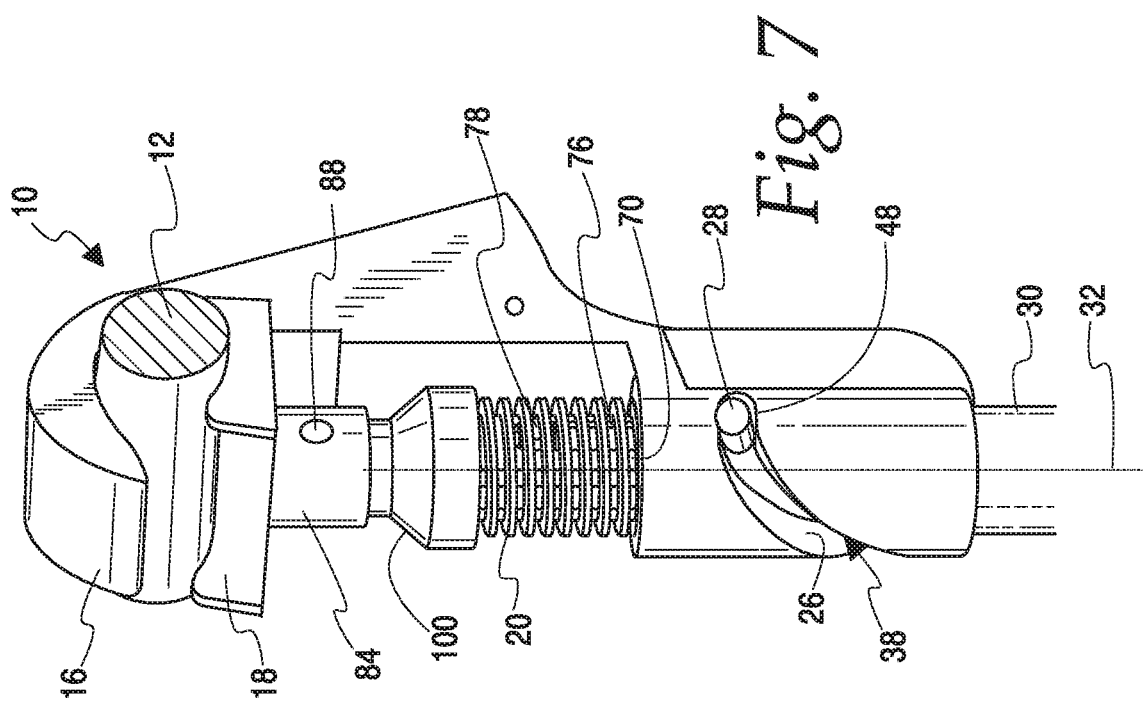
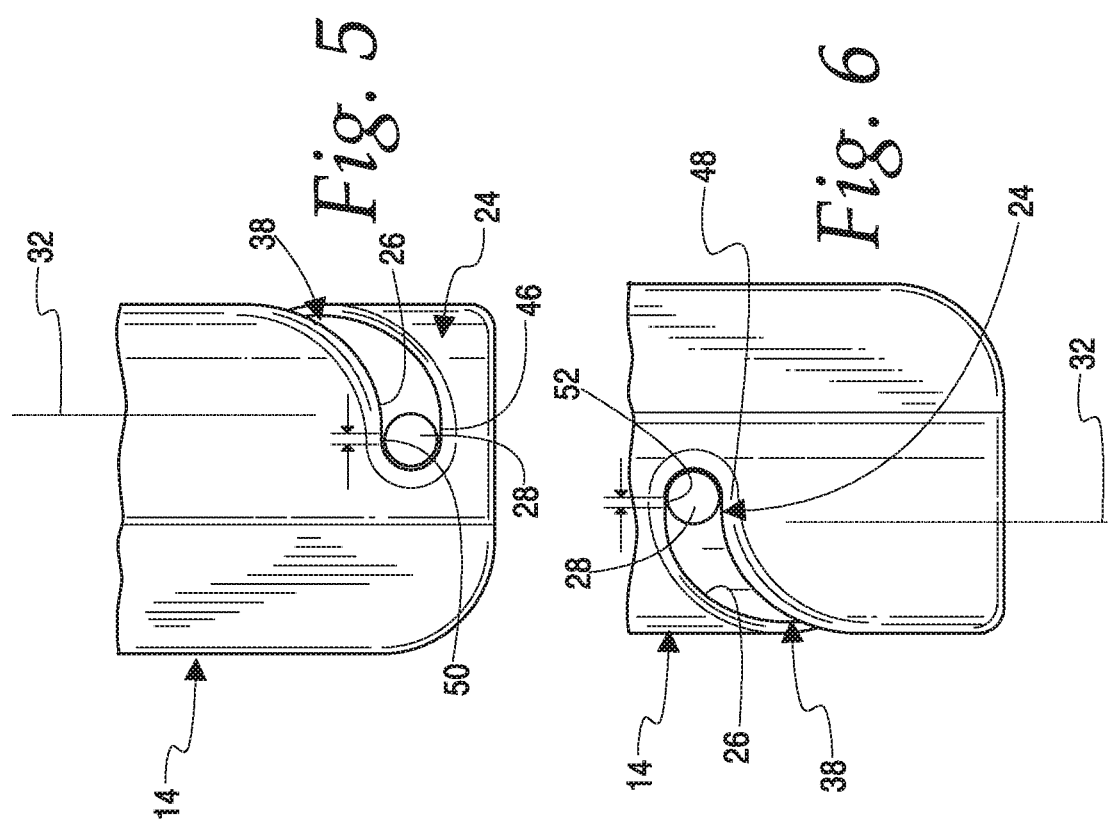

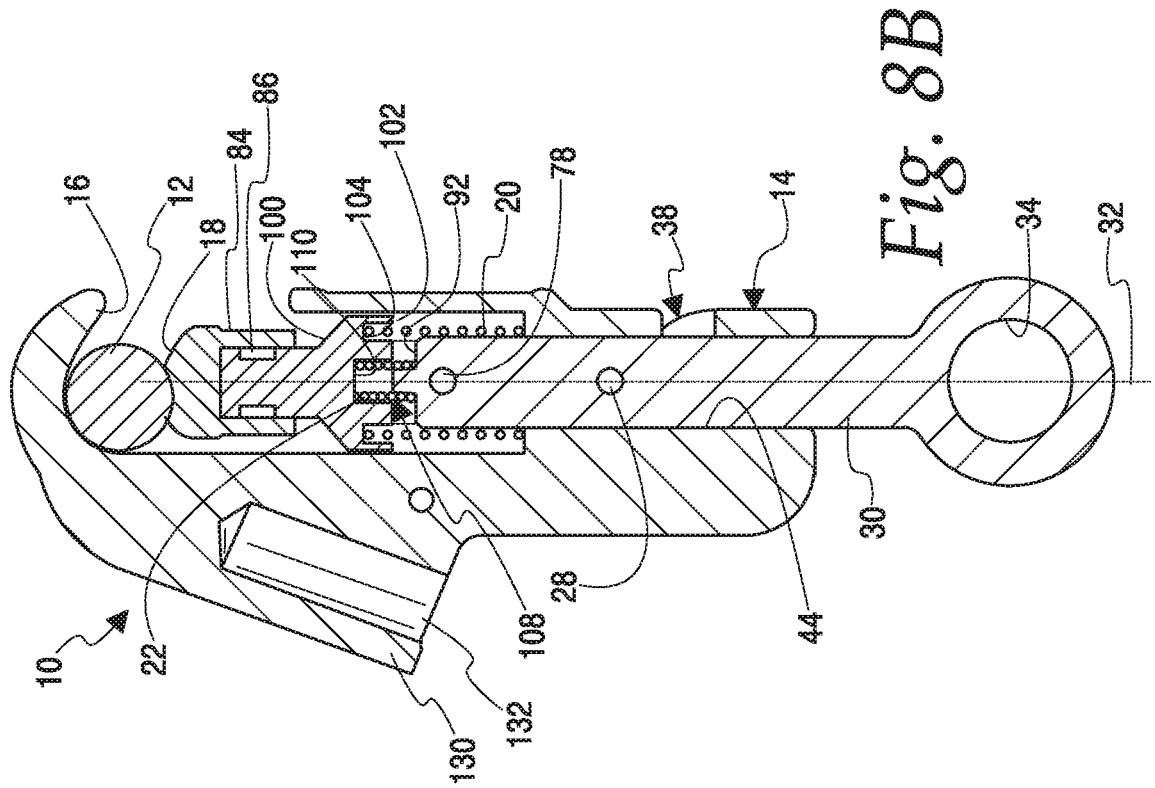
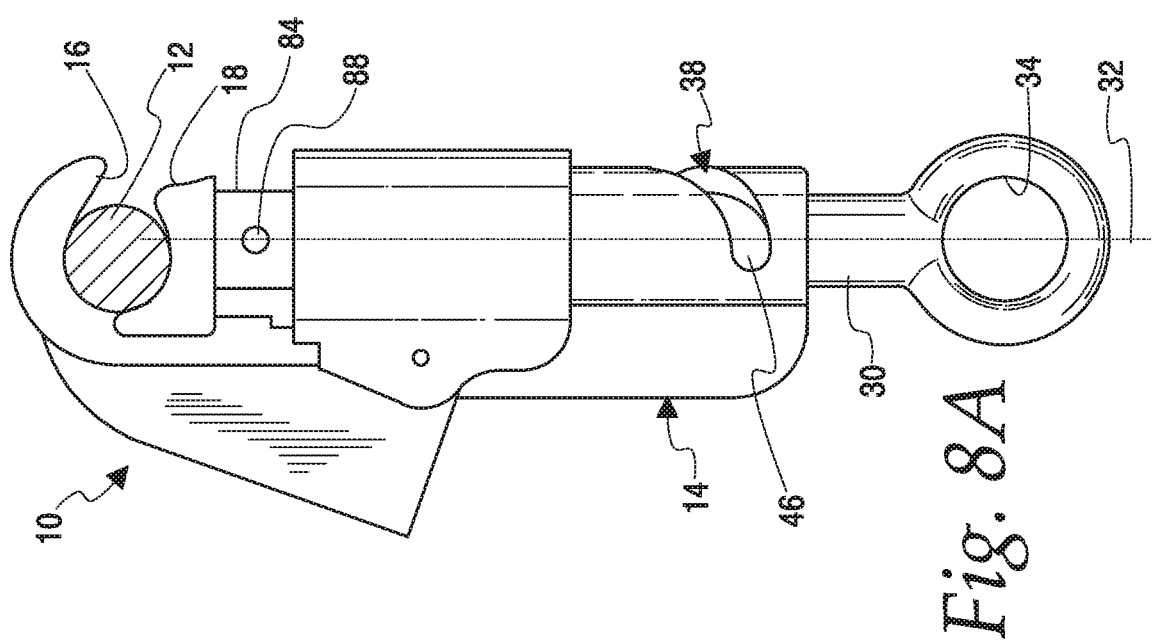

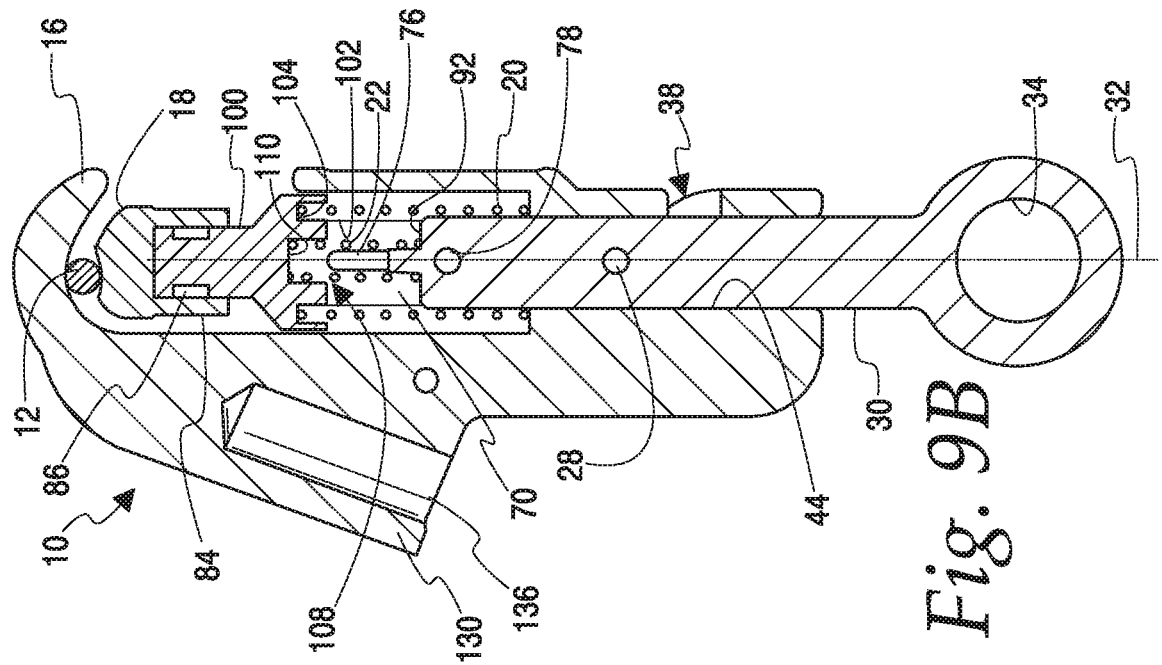
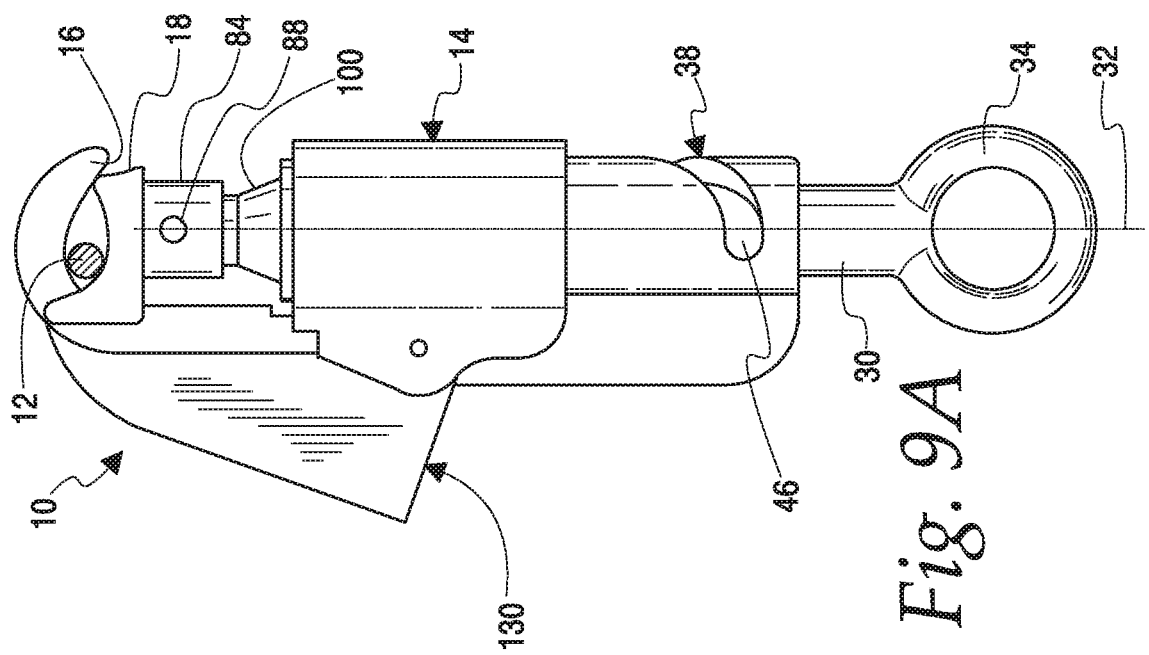

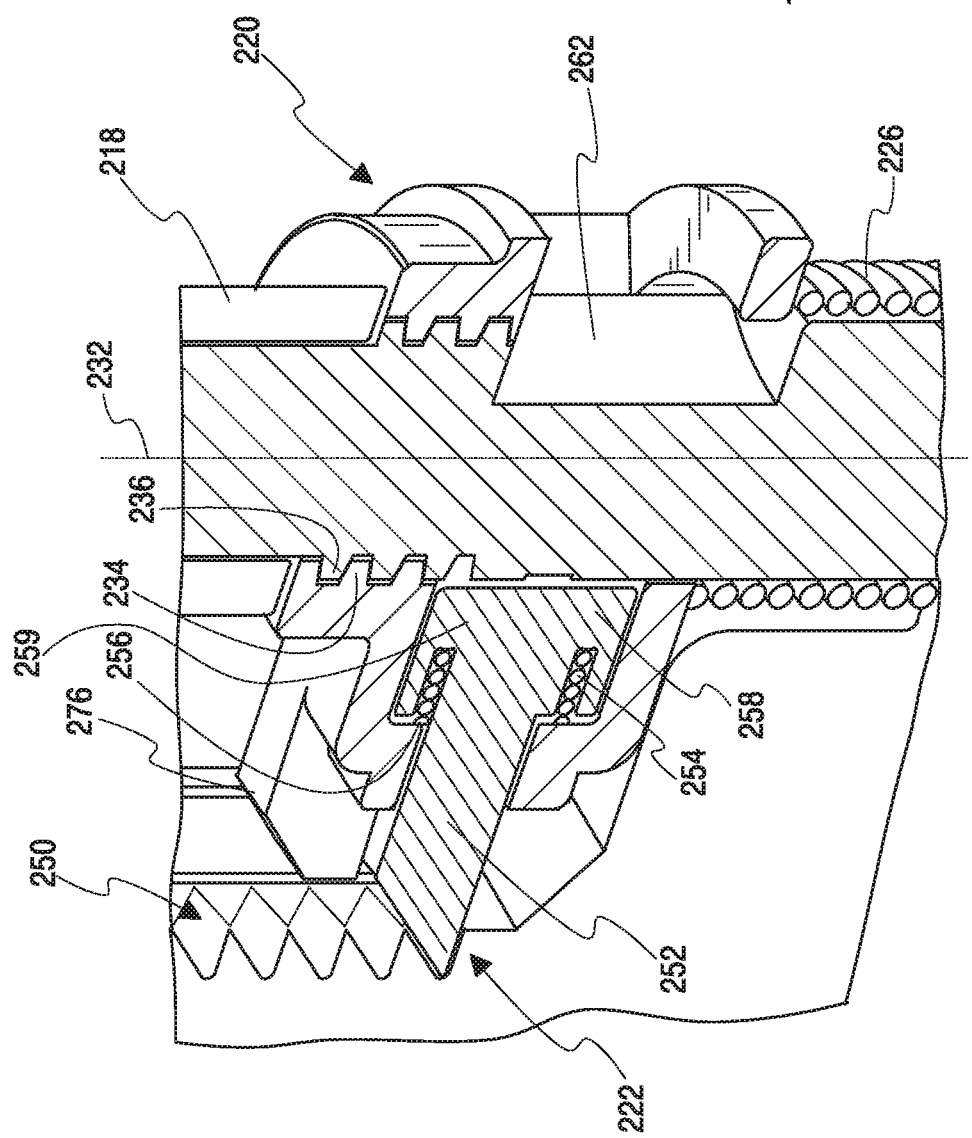

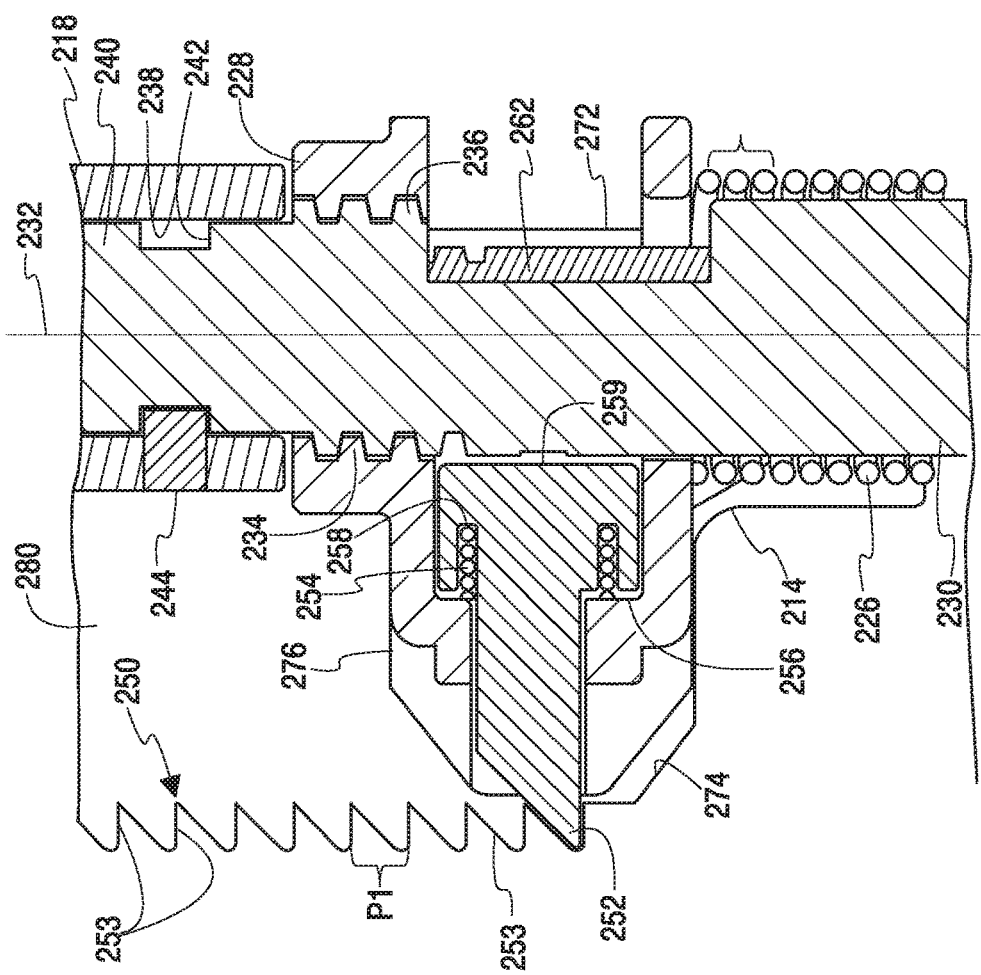
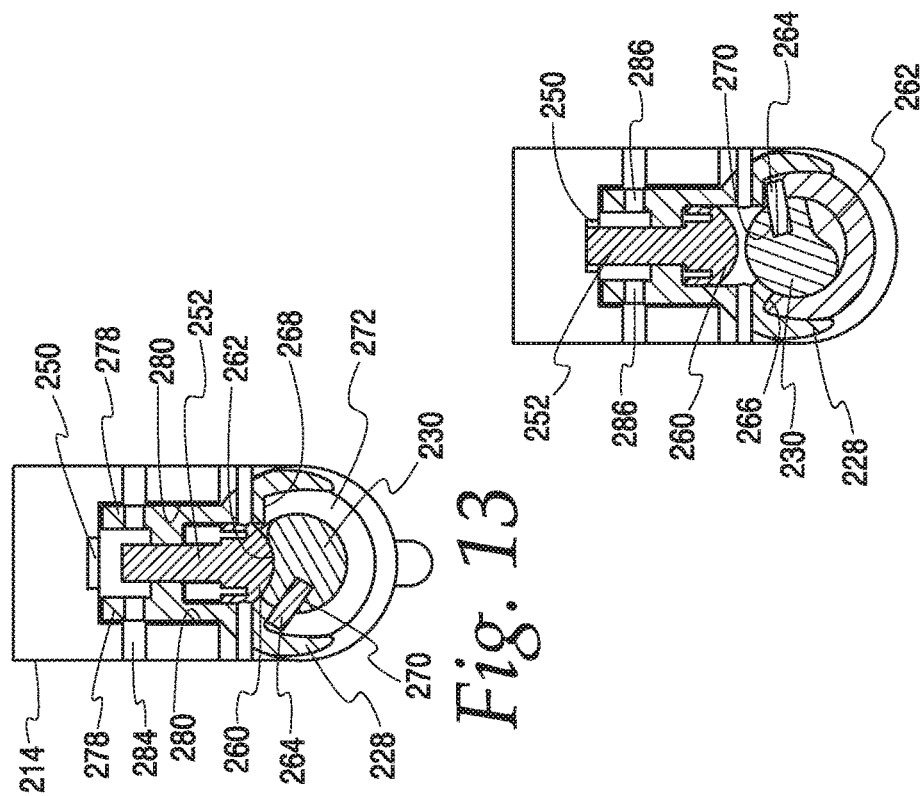
Fig. 15
Fig. 13
Fig. 14

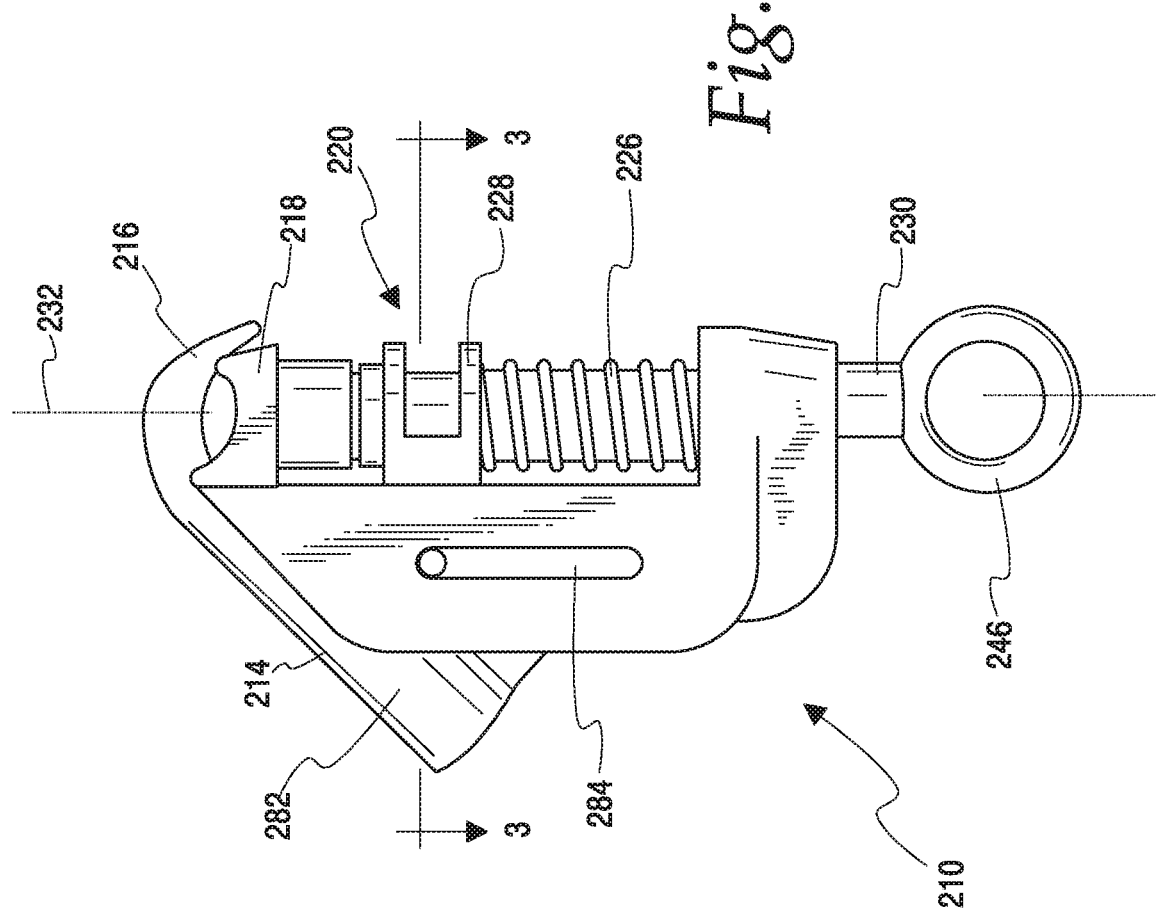

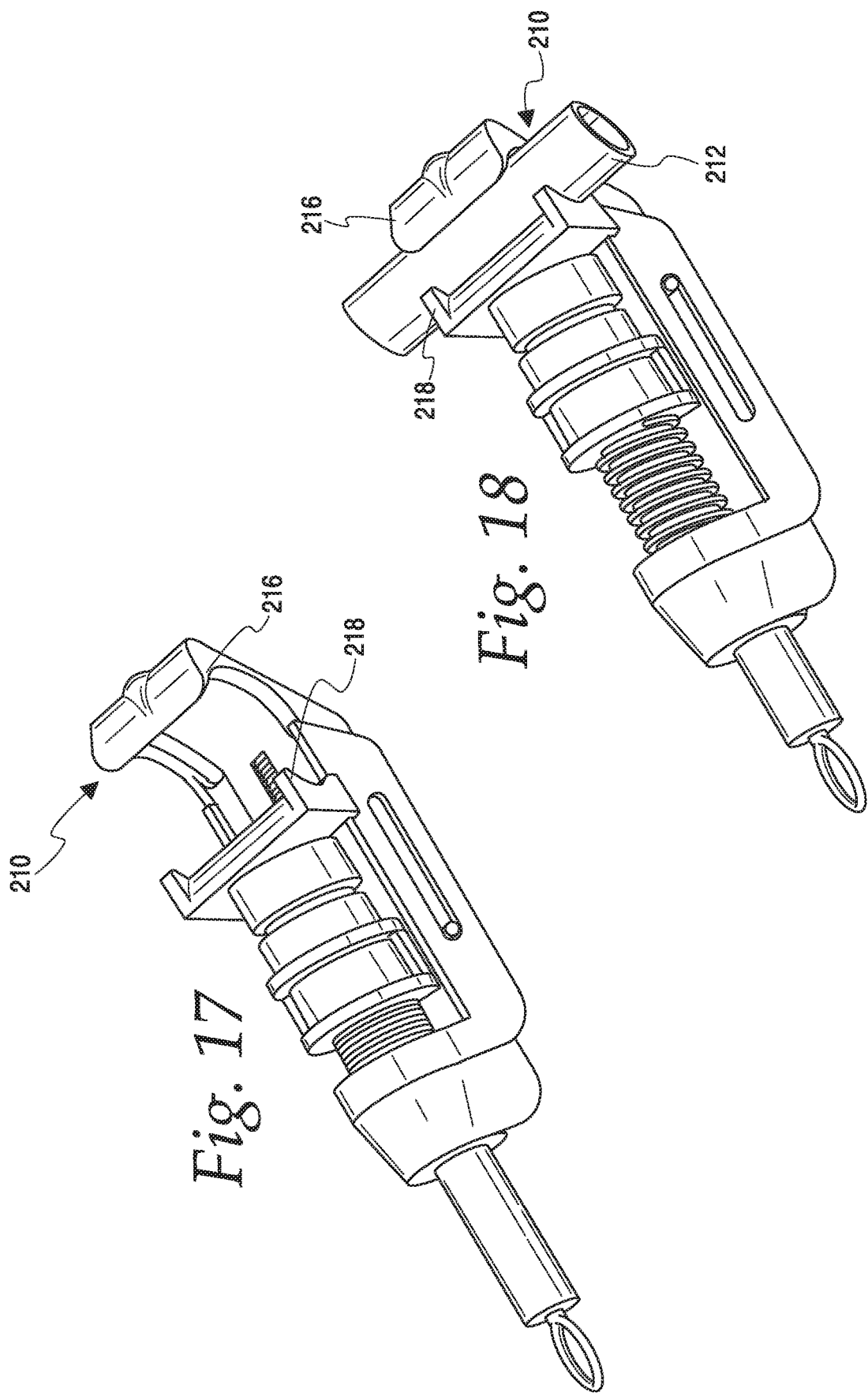

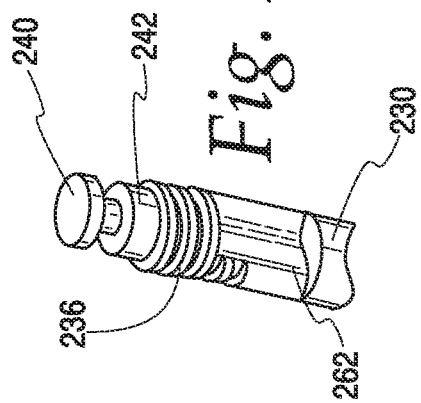
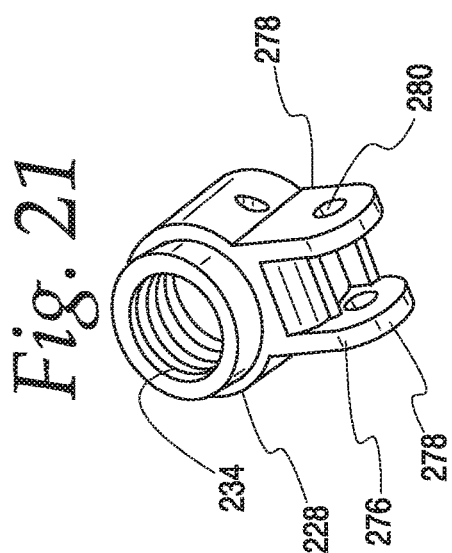
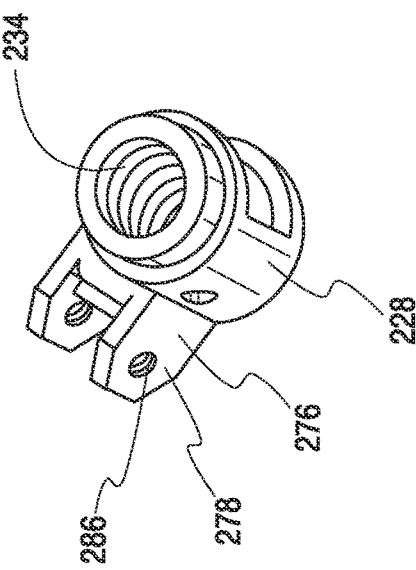
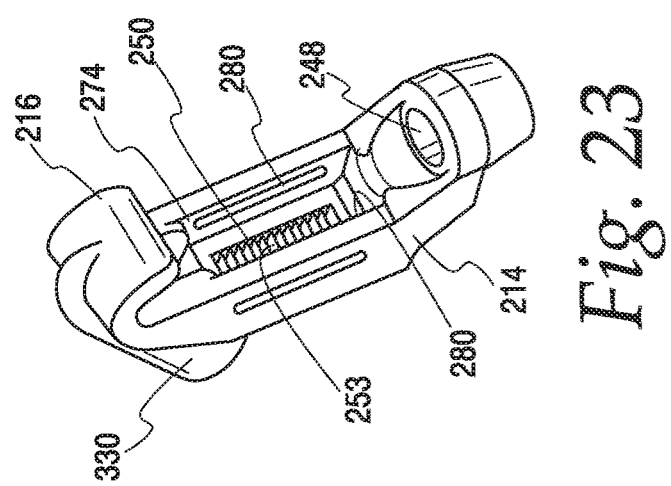

CAM DRIVEN, SPRING LOADED GROUNDING CLAMP

FIELD

This disclosure is directed toward grounding clamps such as are used by electric linemen and other workers to provide a grounded connection to an overhead electrical conductor, such as an overhead electrical power line and the like, wherein the grounding clamp is operated via an elongate stick or pole, typically, a "shotgun stick".

BACKGROUND

Electrical linemen use grounding clamps in their daily work. The linemen use an elongate stick or pole, typically one called a "shotgun stick", to grab an overhead electrical conductor, typically an electric wire, post or ball stud, with the clamp. Once the overhead electrical conductor is engaged, the lineman then tightens the clamp onto the overhead electrical conductor by rotating the stick while holding the clamp on the overhead electrical conductor. This process is time consuming and difficult for the lineman who is operating the stick overhead either from the ground or an elevated bucket. For each operation of a conventional grounding clamp, the number of screw rotations undertaken are at least 15. The lineman operates many such grounding clamps at a stretch in the field and, at end of the exercise, can become very exhausted.

SUMMARY

In accordance with one feature of this disclosure, a grounding clamp is provided for use on an overhead electrical conductor, with the grounding clamp being actuated by a user operated elongate stick or pole. The grounding clamp includes a body connectable to an electrical conductor to provide an electrically conductive connection. The grounding claim includes first and second jaws extend from the body and are movable relative to each other between an open position wherein an overhead electrical conductor may be inserted into the clamp and a closed position wherein the overhead electrical conductor can be clamped between the jaws to provide an electrically conductive connection between the clamp and the overhead electrical conductor. The grounding clamp further includes at least one spring biases the jaws toward the closed position, and a cam mechanism operably connected to at least one of the jaws to move the jaws between the open and closed positions. The cam mechanism includes a cam surface and a cam follower, with one of the cam surface and the cam follower being carried on the body and the other of the cam surface and the cam follower being carried on a rotatable member mounted in the body for rotation about an axis relative to the cam surface.

As one feature, the rotatable member includes a torque connection engageable by a user operated stick or pole.

In one feature, the first jaw is fixed on the body and the second jaw is moveable relative to the body.

According to one feature, the second jaw and the rotatable member are translatable relative to the body along the axis, and the rotatable member translates along the axis in response to movement of the cam follower along the cam surface.

As one feature, the first jaw and the body are a one-piece component of the clamp.

In one feature, the cam surface is carried on the body and the cam follower is carried on the rotatable member.

According to on feature, the cam surface defines a helical path for the cam follower centered on the axis.

As one feature, the cam surface is defined by a helical shaped groove. In a further feature, the groove includes opposite end portions that extend transverse to the axis, one of the end portions receiving the cam follower in the closed position and the other of the end portions receiving the cam follower in the open position.

According to one feature, the cam follower comprises a cylindrical shaped surface slidably engaged with the cam surface. As a further feature, the cam follower includes a cylindrical shaped post defining the cylindrical shaped surface.

In one feature, the at least one spring includes a first spring operably engaged between the body and the second jaw. According to a further feature, the at least one spring further includes a second spring operably engaged between the rotatable member and the second jaw.

As one feature, a spring load member transfers force from the at least one of the springs to the second jaw.

In one feature, the at least one spring includes first and second springs, with the first spring operably engaged between the housing and the spring load member and the second spring operable engaged between the rotatable member and the spring load member.

According to one feature, the body further includes a boss configured to receive an end of an electrical conduit to form an electrically conductive connection with the electrical conduit.

It should be understood that this disclosure contemplates a grounding clamp with any combination of the above features.

In accordance with one feature of this disclosure, a grounding clamp is provided for use on an overhead electrical conductor, the grounding clamp being actuated by a user operated elongate stick or pole. The grounding clamp includes a body connectable to an overhead electrical conductor to provide an electrically conductive connection. The grounding clamp includes first and second jaws extending from the body and movable relative to each other to allow an overhead electrical conductor to be inserted between the jaws and then clamped between the jaws to provide an electrically conductive connection between the clamp and the overhead electrical conductor. A tightening mechanism is configured to tighten the jaws against an overhead electrical conductor in response to actuation of the tightening mechanism by a user. A ratchet mechanism is configured to allow the tightening mechanism to be translated relative to the body to any of a plurality of predetermined, linearly spaced, fixed positions to adjust the spacing between the jaws.

As one feature, the ratchet mechanism includes a ratchet fixed on one of the tightening mechanism and the body. A tooth is mounted to the other of the body and the tightening mechanism for movement between an engaged position wherein the tooth is engaged with the ratchet to fix the tightening mechanism in one of the predetermined, linearly spaced, fixed positions and a free position wherein the tooth is disengaged from the ratchet to allow the tightening mechanism to be moved from one of the predetermined, linearly spaced, fixed positions to another.

In one feature, the ratchet is fixed to the body and the tooth is mounted to the tightening mechanism.

According to one feature, the ratchet mechanism further includes a rotatable cam surface configured to move the tooth from the free position to the locked position in response to actuation by a user.

As one feature, the cam surface is carried on a rotatable member mounted for rotation relative to the body.

In one feature, the rotatable member is engaged with the tightening mechanism for movement with the tightening mechanism as the tightening mechanism is moved from one of the predetermined, linearly spaced fixed positions to another.

According to one feature, the tightening mechanism includes screw threads engaged with mating screw threads carried on the rotatable member.

As one feature, the second jaw is carried on the rotatable member and mounted for rotation relative to the rotatable member.

In one feature, the tightening mechanism includes a carriage member mounted to the body for translation relative to the body and fixed against rotation relative to the body, and the screw threads of the tightening mechanism are internal screw threads carried on the carriage member.

According to one feature, the tooth is mounted in the carriage member for translation relative to the carriage member.

As one feature, the grounding clamp further includes a spring mounted in the tightening mechanism to bias the tooth to the free position.

In one feature, the tightening mechanism includes a carriage member mounted to the body for translation relative to the body and fixed against rotation relative to the body.

According to one feature, the tooth is mounted in the carriage member for translation relative to the carriage member.

As one feature, the first jaw is fixed to the body and the second jaw is mounted for translation relative to the body and the first jaw.

In one feature, the grounding clamp further includes a spring biasing the jaws toward a closed position.

According to one feature, the rotatable member includes a torque connection engageable by a user operated stick or pole.

As one feature, the first jaw and the body are a one-piece component of the clamp.

In one feature, the body further includes a boss configured to receive an end of an electrical conduit to form an electrically conductive connection with the electrical conduit.

It should be understood that this disclosure contemplates a grounding clamp with any combination of the above features.

Other features and advantages will become apparent from a review of the entire specification, including the appended claims and drawings.

BRIEF DESCRIPTION OF THE DRAWINGS

FIG. 1 is a somewhat diagrammatic isometric view of a grounding clamp according to this disclosure shown in an open position/condition;

FIG. 2 is an isometric view taken from an opposite side of FIG. 1 and showing the grounding clamp in a closed position/condition;

FIG. 3 is a cross section taken from line 3-3 in FIG. 1;

FIG. 4 is an isometric view of selected components of the grounding clamp of FIGS. 1-3;

FIG. 5 is an enlarged broken view of a portion of the grounding clamp of FIGS. 1-4 showing a cam surface and a cam follower of the grounding clamp with the grounding clamp in the open position/condition of FIG. 1;

FIG. 6 is a view similar to FIG. 5, but showing the cam surface and cam follower with the grounding clamp in the closed position/condition shown in FIG. 2;

FIG. 7 is a perspective view of another embodiment of the grounding clamp according to this disclosure, with the grounding clamp shown in a closed position/condition;

FIG. 8A is a side elevation of the embodiment of the grounding clamp of FIG. 7 in a closed position/condition on a first size of overhead electrical conductor;

FIG. 8B is a view similar to FIG. 8A, but shown in cross section;

FIG. 9A is a view similar to FIG. 8A, but showing the grounding clamp in a closed position/condition with a smaller overhead electrical conductor; and FIG. 9B is a view similar to FIG. 8B, but showing the grounding clamp in a closed condition with the smaller overhead electrical conductor of FIG. 9A.

FIG. 12 is an enlarged, section view showing a portion of the grounding clamp of FIG. 10, and with non-enlarged perspective views of selected components of the grounding clamp surrounding the enlarged, section view;

FIG. 13 is a section view taken along line 3-3 in FIG. 10, and showing selected components in a first position/condition;

FIG. 14 is a view similar to FIG. 13, but showing the selected components in a second position/condition;

FIG. 15 is an enlarged section view showing selected components of the grounding clamp of FIG. 10 together with a text explanation of some desired relationships for certain features of the grounding clamp of FIG. 10;

FIG. 16 is a side elevation view of the grounding clamp of FIG. 10;

FIG. 17 is a isometric view showing the jaws of the grounding clamp in an open position/condition;

FIG. 18 is a view similar to FIG. 17, but showing the jaws of the grounding clamp in a closed position/condition;

FIG. 19 is a isometric view of a tooth component of the grounding clamps of FIGS. 1-18;

FIG. 20 is a isometric view from above of a portion of a rotatable member of the grounding clamp of FIGS. 10-19;

FIGS. 21 and 22 are isometric views of a carriage member of the grounding clamp of FIGS. 10-20; and FIG. 23 is a isometric view of a body member of the grounding clamp of FIGS. 10-22.

DETAILED DESCRIPTION

Figure 11:
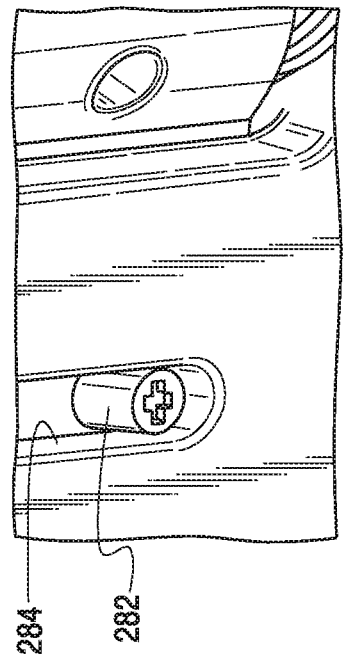
FIG. 11 is an enlarged view of a portion of FIG. 10.

One embodiment of the grounding clamp described herein can solve the fatigue problem discussed in the Background section, can allow for the grounding clamp to be quickly installed, and can ease the difficulties faced during clamp installation by removing the necessity to rotate the screw of a conventional grounding clamp numerous times before it is tightened. It also improves lineman productivity, especially when a lineman has multitude of such clamps to deal with at a stretch.

The grounding clamp disclosed herein is a spring loaded, cam driven device that will close the clamp almost completely with only a small amount of manual tightening. Although the concept is shown and described herein in connection with one particular type of grounding clamp and clamp jaws, the concept can be applied to all other grounding clamps, including C-clamps and duck bill clamps and clamps for ball studs.

With reference to FIGS. 1 and 2, a grounding clamp 10 is shown for use on an overhead electrical conductor 12, with the grounding clamp 10 being the type that is actuated by a user operated elongate stick or pole, typically a so-called "shotgun stick" (not shown). The grounding clamp 10 includes a body 14 that is connectable to the electrical conductor 12 to provide an electrically conductive connection. First and second jaws 16 and 18 extending from the body 14 and are movable relative to each other between an open position (shown in FIG. 1) wherein the overhead electrical conductor 12 may be inserted into the grounding clamp 10 and a closed position (shown in FIG. 2) wherein the overhead electrical conductor 12 can be clamped between the jaws 16 and 18 to provide an electrically conductive connection between the clamp 10 and the overhead electrical conductor 12.

With reference to FIG. 3, in the illustrated embodiment, the grounding clamp 10 includes a main spring 20 and a lock-in spring 22 biasing the jaws 16 and 18 to the closed position, and a cam mechanism, shown generally at 24 in FIGS. 1 and 2, operably connected to the jaw 18 to move the jaw 18 between the open and closed positions. It should be appreciated that while two springs 20 and 22 are shown in the illustrated embodiment, in some applications it may be desirable to use a single spring, or more than two springs. The cam mechanism 24 includes a cam surface 26 and a cam follower 28, with the cam surface 26 being carried on the body 14 and the cam follower 28 being carried on a rotatable member 30 mounted to the body 14 for rotation relative to the cam surface 26 about a longitudinally extending axis 32. The cam follower 28 can be provided in the form of a cylindrical pin that is press fit into the rotatable member 30. It should be appreciated that while the cam surface 26 is shown on the body 14 and the cam follower 28 is shown on the rotatable member 30 in the illustrated embodiments, in some applications it may be desirable for the cam follower 28 to be carried on the body 14 and for the cam surface 26 to be carried on the rotatable member 30. The rotatable member 30 includes a torque connector 34 illustrated in the form of a torque ring or eyelet 34, such as is well known in the industry, for engagement with the user operated elongate stick or pole, again typically a shotgun stick, and for transferring a rotational torque applied by the elongated stick or pole to the rotatable member 30 to thereby actuate the jaws 16 and 18 between the open and closed positions.

In the illustrated embodiment, the jaw 16 is fixed on, and indeed is a unitary part, of the body 14 which is a one piece, unitary construction, and the jaw 18 is movable relative to the body 14, and in the illustrated embodiment, is translatable relative to the body 14 along the axis 32. In this regard, the jaw 18 may include any suitable anti-rotation feature that also guides the jaw 18 for translation along the axis 32 relative to the body 14, and will typically be a pair of shoulders on the jaws 18 that extend on either side of a longitudinally extending rail formed in the body 14. While the illustrated embodiment shows the jaw 16 as being fixed to the body 14, in some applications it may desirable for both jaws 16 and 18 to be movable relative to the body 14. It should be appreciated that while the jaws 16 and 18 are shown having conductor engagement surfaces that are concave, this disclosure contemplates that any suitable shape can be used for the jaws 16 and 18 and the surfaces of the jaws 16 and 18 that engage the overhead electrical conductor 12. The rotatable member 30 is also mounted in the body 14 to translate along the axis 32, and the cam mechanism 24 forces the rotatable member 30 to translate along the axis 32 in response to the application of a rotational torque to the torque connection 34 by the user operated elongate stick or pole. In this regard, the rotatable member 30 translates along the axis 32 in response to movement of the cam follower 28 along the cam surface 26. Further in this regard, the cam surface 26 defines a helical path for the cam follower 28 centered on the axis 32, with the cam surface 26 being defined by a helical shaped groove or slot 38 formed in the body 14. In the illustrated embodiment, the cam follower 28 includes a cylindrical-shaped surface 40 slidably engaged with the cam surface 26, with the cylindrical-shaped surface 40 in the illustrated embodiment being defined by a cylindrical-shaped pin or post 42 extending radially outward from the rotatable member 30. Furthermore, as best seen in FIG. 3, the rotatable member 30 has a cylindrical shape that is received in a conforming bore 44 formed in the body 14 with a sliding and rotating engagement.

As best seen in FIGS. 5 and 6, the groove 38 includes opposite end portions 46 and 48 that extend transverse to the axis 32 for a short circumferential distance. When the jaws 16 and 18 are moved to the open position shown in FIGS. 1 and 5, the cam follower 28 frictionally engages a flat "land" 50 in the end portion 46 that extends transverse to the axis 32 to thereby lock the clamp 10 in the open position until a user applies sufficient force to move the cam follower 28 from the end portion 46. In this regard, it should be appreciated that the axial load of the springs 20 and 22 is reacted through the engagement of the cam follower 28 with the land 50 and the resulting friction resistance in the transverse direction must be overcome to move the cam follower 28 from the end portion 46. Similarly, when the jaws 16 and 18 are moved to the closed position shown in FIGS. 2 and 6, the cam follower 28 frictionally engages a flat "land" 52 in the end portion 48 that extends transverse to the axis 32 to thereby lock the clamp 10 in the closed position. Again in this regard, it should be appreciated that the axial load of the springs 20 and 22 is at least partially reacted through the engagement of the cam follower 28 with the land 52 and the resulting friction resistance in the transverse direction must be overcome to move the cam follower 28 from the end portion 48.

As best seen in FIGS. 3 and 4, the clamp 10 further includes a spring load member 60 that transfers force from the main spring 20 to the jaw 18 via engagement with a second spring load member 62 which also serves to mount the jaw 18. As best seen in FIG. 4, the spring load member 60 includes an annular rim or rib 66 that is received in a conforming bore 68 of the body 14 for guided translation along the axis 32. Additionally, as best seen in FIG. 4, the spring load member 60 includes a pair of legs 70 that are spaced by a slot 72 that receives an elongate, rectangular shaped post or stud 74 formed on an end of the rotatable member 30. Each of the legs 70 includes an axially extending slot 76 (only one shown in FIG. 4) that receives a corresponding, cylindrical shaped follower or pin 78 (only one shown in FIG. 4) that extends transversely from the stud 74 of the rotatable member 30. The interaction of the followers 78 in the slots 76 serves to guide the spring load member 60 for translation relative to the rotatable member 30 and engagement of the followers 78 against the bottom 79 of the slots 78 serves to force the spring guide 60 and the jaw 18 to the open position when the cam follower 28 is moved to the end portion 46 of the groove 38. The main spring 16 is engaged between the annular rim 66 of the spring load member 60 and a shoulder or wall 80 at the bottom of the bore 68 in the main housing 14. As best seen in FIG. 3, the spring load member 62 is cylindrical in shape and is rotatably received in a conforming bore 82 formed in a downwardly extending post 84 of the jaw 18. The spring load member 62 includes an annular groove 86 that receives a radially inwardly directed pin 88 that is fixed via a press fit in the cylindrical post 84 of the jaw 18 to prevent relative axial motion between the jaw 18 and the spring load member 62 while allowing the spring load member 62 to rotate relative to the jaw 18. The lock-in spring 18 extends between a bottom surface 90 of the spring load member 62 and an upper shoulder 92 formed on the stud 74 of the rotatable member 30, and in the illustrated embodiment is piloted on a post (not shown) that either extends upwardly from the stud 74 or downwardly from the spring load member 62.

FIGS. 7-9B show an alternate embodiment of the clamp 10 having a single spring load member 100 that incorporates features of both the spring load member 60 and 62 of the embodiments of FIGS. 1-6, but is identical to the clamp 10 of FIGS. 1-6 with respect to the other components and features. The spring load member 100 includes the legs 70, slot 72 and slots 76 of the spring load member 60, and the cylindrical shape of the spring load member 62 that is received in the bore 82 of the downwardly extending cylindrical post 84 of the jaw 18. With respect to those features, the spring load member 100 operates in the same fashion as previously described above in connection with the spring load members 60 and 62. As best seen in FIGS. 8B and 9B, the spring load member 100 includes a downwardly opening annular groove 102 centered on the axis 32 that receives an end of the main spring 20 so that the main spring 20 is loaded between a downwardly facing surface 104 in the groove 102 and the shoulder 80 at the bottom of the bore 68 in the main housing 14. The spring load member 100 further includes a bore 108 centered on the axis 32 and having a downwardly facing surface 110 that engages the lock-in spring 22 so that the lock-in spring 22 is loaded between the downwardly facing surface 110 and the shoulder 92 on the stud 74 of the rotatable member 30.

The body 14 includes a boss 130 having a bore 132 that is configured to receive an end of an electrical conduit to form an electrical conductive ground connection with the electrical conduit (not shown). While a specific type of boss 130 is shown, it should be appreciated that there are many suitable and known types of such bosses and/or connectors for an electrically conductive ground wire, any of which can be utilized in a clamp 10 according to this disclosure.

In use, the rotatable member 30 is rotated counter-clockwise against the spring force to open up the clamp jaws 16 and 18. The cam follower 28 is at the bottom most position 46 in the groove 38 and locked in place. The user will do this before inserting the clamp 10 into the shotgun stick. Once the clamp 10 is inserted into the shotgun stick, the user reaches the overhead electrical conductor 12 and hangs the clamp 10. Then, the user releases the clamp 10 from the stick which still engages the eyelet 34 of the rotatable member 30, pulls the eyelet 34 a little downward against the spring force to unlock and release the rotatable member 30. The user then allows the main spring force to move the jaw 18 up (closes it) until it touches the conductor 12. The cam follower 28 is now at an intermediate position inside the groove 38. The lineman now uses the shotgun stick to manually rotate the member 30 in clockwise direction by almost ½-¼ turn to lock the member 30 in place by engaging the cam follower 28 in the end portion 48 of the groove 38. This rotation compresses the lock-in spring 22 and loads the jaw against the conductor 12 to hold the conductor 12 tightly in place.

It should be appreciated that while specific forms and geometries have been shown herein for the components of the specific embodiments of the clamp 10 in the illustrations, this disclosure contemplates that other forms and geometries may be utilized with the concepts disclosed herein and that the concepts disclosed herein can find use and be incorporated in any type of grounding clamp for use with overhead electrical conductors.

Another embodiment of the grounding clamp disclosed herein includes a ratchet mechanism that will close the clamp almost completely in response to a linear actuating force, with only a small amount of manual tightening remaining after the ratchet mechanism has been actuated. Although the concept is shown and described herein in connection with one particular type of grounding clamp and clamp jaws, the concept can be applied to all other grounding clamps, including C-clamps and duck bill clamps and clamps for ball studs.

Figure 10:
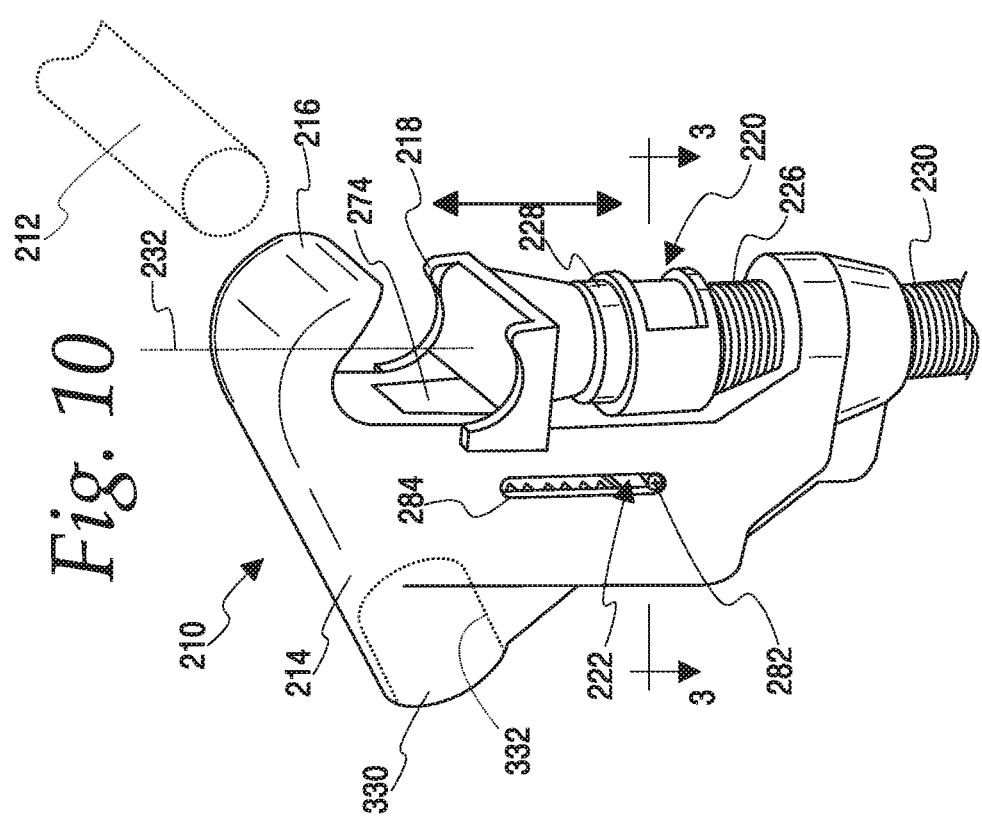
FIG. 10 is an isometric view from above of a grounding clamp according to this disclosure.

With reference to FIG. 10, a grounding clamp 210 is shown for use on an overhead electrical conductor 212, with the grounding clamp 210 being the type that is actuated by a user operated elongate stick or pole, typically a so-called "shotgun stick" (not shown). The grounding clamp 210 includes a body 214 that is connectable to the electrical conductor 212 to provide an electrically conductive connection. First and second jaws 216 and 218 extending from the body 214 and are movable relative to each other between an open position (shown in FIGS. 10 and 17) wherein the overhead electrical conductor 212 may be inserted into the grounding clamp 210 and a closed position (shown in FIG. 18) wherein the overhead electrical conductor 212 can be clamped between the jaws 216 and 218 to provide an electrically conductive connection between the clamp 210 and the overhead electrical conductor 212.

With reference to FIGS. 10, 12, 15 and 19-27, in the illustrated embodiment, the grounding clamp 210 includes a tightening mechanism, shown generally at 220, operably connected to the jaw 218 to tighten the jaw 218 against a conductor 212 in response to manual actuation of the tightening mechanism 220 by a user, and a ratchet mechanism 222 configured to allow the tightening mechanism 220 to be translated relative to the body 214 to any of a plurality of predetermined, linearly spaced, fixed positions to adjust the spacing between the jaws 216 and 218 prior to the tightening mechanism 220 being actuated to clamp the conductor 212 between the jaws 216 and 218. A spring 226 is mounted between the body 214 and the tightening mechanism 220 to bias the jaws 216 and 218 toward each other, and specifically in the illustrated embodiment to bias the tightening mechanism 220 and the jaw 218 toward the jaw 216. In this regard, in many applications it will be desirable for the spring 226 to have a sufficient spring force to overcome any mechanical friction and gravity loads to move the tightening mechanism 220 and the jaw 218 into engagement with a conductor 212 that has been inserted between the jaws 216 and 218.

The tightening mechanism 220 includes a carriage member 228 and a rotatable member 230, both of which are mounted to the body 214 for translation along a longitudinally extending axis 232. The jaw 218 is carried on the rotatable member 230 and mounted rotation of the rotatable member 230 relative to the jaw 218. The spring 226 is engaged against the carriage member 228 to urge the carriage member 228, the rotatable member 230, and the jaw 218 toward the jaw 216. As best seen in FIGS. 12 and 15, the carriage member 228 includes internal screw threads 234 that are engaged with external screw threads 236 on the rotatable member 230. The interaction of the mating screw threads 234, 236 force the jaw 218 toward the jaw 216 to tighten the jaws 216, 218 on a conductor 212 when the rotatable member 230 is rotated in a first direction (clockwise) and away from the jaw 216 when the rotatable member 230 is rotated in a second direction (counter clockwise) opposite from the first direction. In the illustrated embodiment and has best seen in FIG. 15, the jaw 218 includes a bore 238 that receives a cylindrical stub 240 formed on the end of the rotatable member 230. The stub 240 includes an annular groove 242 that receives a lock pin 244 that is fixed in the jaw 218 to restrict axial movement of the jaw 218 relative to the rotatable member 230 while allowing the rotatable member 230 to rotate about the axis 232 relative to the jaw 218. As best seen in FIG. 16, the rotatable member 230 includes a torque connector 246 illustrated in the form of a torque ring or eyelet 246, such as is well known in the industry, for engagement with the user operated elongate stick or pole, again typically a shotgun stick, and for transferring a rotational torque applied by the elongated stick or pole to the rotatable member 230 to thereby actuate the jaws 216 and 218 between the open and closed positions.

In the illustrated embodiment, the jaw 216 is fixed on, and indeed is a unitary part, of the body 214 which is a one piece, unitary construction, and the jaw 218 is movable relative to the body 214, and in the illustrated embodiment, is translatable relative to the body 214 along the axis 232. In this regard, the jaw 218 may include any suitable anti-rotation feature that also guides the jaw 18 for translation along the axis 232 relative to the body 214, and will typically be a pair of shoulders on the jaws 218 that extend on either side of a longitudinally extending rail formed in the body 214. While the illustrated embodiment shows the jaw 216 as being fixed to the body 214, in some applications it may desirable for both jaws 216 and 218 to be movable relative to the body 214. It should be appreciated that while the jaws 216 and 218 are shown having conductor engagement surfaces that are concave, this disclosure contemplates that any suitable shape can be used for the jaws 216 and 218 and the surfaces of the jaws 216 and 218 that engage the overhead electrical conductor 212. The rotatable member 230 is also mounted in the body 214 to translate along the axis 232 in response to the force of the spring 226 and to linear actuation forces applied to the rotatable member 230 by a user via engagement of a hot stick with the eyelet 246. The rotatable member 230 has a cylindrical shape that is received in a conforming bore 248 formed in the body 214 with a sliding and rotating engagement.

The ratchet mechanism 222 includes a longitudinally extending, ratchet 250 and tooth 252. In the illustrated embodiment, the ratchet 250 is carried on the body 214 and the tooth 252 is mounted for translation in the carriage member 228 between an engaged position (shown in FIGS. 14 and 15) wherein the tooth 252 is engaged with the ratchet 250 to fix the tightening mechanism 220 in one of the predetermined, linearly spaced, fixed positions and a free position wherein the tooth 252 is disengaged from the ratchet 250 to allow the tightening mechanism 220 to be translated between the predetermined, linearly spaced, fixed positions, with each of the fixed position being defined one of the plurality of ratchet teeth 253 on the ratchet 250. In the illustrated embodiment, a spring 254 is mounted between a shoulder 256 on the carriage member 228 and a shoulder 258 on the tooth 252 to bias the tooth 252 to the free position, with the shoulder 258 being defined by a bottom surface of an annular groove formed in a head portion 259 of the tooth 252. The tooth 252 includes an arcuate cam follower surface 260 that is forced against a cam surface 262 defined on the rotatable member 230. In the illustrated embodiment, the cam follower surface 260 is formed on the head portion 259. The cam surface 262 is shaped to allow the tooth 252 to move to the open position when the rotatable member 230 is in a first angular position, as shown in FIG. 13, and then to force the tooth 252 from the open position to the engaged position as the rotatable member 230 is rotated from the first angular position to a second angular position (as shown in FIG. 14). In the illustrated embodiment, the first and second angular positions are separated by 215angular degrees, but it should be understood that in some applications a larger or smaller angular separation may be desirable. A stop feature 264 is provided on the rotatable member 230 to engage respective stop surfaces 266 and 268 formed on the carriage member 228 to limit rotation of the rotatable member 230 and cam surface 262, with the stop feature 264 engaging the stop surface 266 in the first angular position shown in FIG. 13 and the stop feature 264 engaging the stop surface 268 in the second angular position shown in FIG. 14. In the illustrated embodiment, the stop feature 264 is provided in the form of a stopper pin 264 press fit into a bore 270 formed in the rotatable member 230. The carriage member 228 is provided with a relief 272 that allows the angular movement of the feature 264. It should be appreciated that the cam surface 262, the stop surfaces 266 and 268 and the relief 272 need to have sufficient axial length along the longitudinal axis 322 to accommodate the translation of the rotatable member 230 relative to the carriage member 228 generated by the interaction of the screw threads 234 and 236 as the rotatable member is rotated between the first and second angular positions.

In the illustrated embodiment, the ratchet 250 is formed in the bottom of a longitudinal groove 274 that extends parallel to the axis 232 and that receives an anti-rotation feature 276 formed on the carriage 228, with side walls 278 of the anti-rotation feature 276 engageable with side walls 280 of the groove 274 to restrict rotation of the carriage member 228 relative to the body 214 and the rotatable member 230. Additional anti-rotation features 282 extending from each of the side walls 278 are received in longitudinal slots 284 formed in the side walls 280 to provide additional stability and strength. In the illustrated embodiment, the anti-rotation members 282 are provided in the form of cylindrical pins 282 press fit into corresponding bores 286 formed in the side walls 278 of the carriage member 228. While the illustrated anti-rotation features are desirable for many applications, it should be understood that other suitable anti-rotation features may be used and are contemplated within the scope of this disclosure.

The body 214 includes a boss 330 having a bore 332 that is configured to receive an end of an electrical conduit to form an electrical conductive ground connection with the electrical conduit (not shown). While a specific type of boss 330 is shown, it should be appreciated that there are many suitable and known types of such bosses and/or connectors for an electrically conductive ground wire, any of which can be utilized in a clamp 210 according to this disclosure.

In use, a user engages the clamp 210 with a "shotgun stick" with a user operated force member engaged with the eyelet 246. The use then uses the shotgun stick to rotate the rotatable member 230 to the first angular position shown in FIG. 13. Next, the user forces the rotatable member to move linearly downward against the force of the spring 226 to move the jaws 216 and 218 to the open position/condition. The user then engages an overhead electrical conductor 212 between the open jaws 216 and 218 and then allows the spring 226 to force the jaw 218 and tightening mechanism 222 toward the jaw 216 until the conductor 212 is engaged with both the jaws 216 and 218. The user then actuates the rotatable member 230 from the first angular position to the second angular position to force the tooth 252 from the free position to the engaged position and to then tightening the jaws against the conductor 212 via the interaction of the mating screw threads 234 and 236 to form a suitable electrically conductive connection between the clamp 210 and the conductor 212. In this regard, with reference to FIG. 15, the pitch P1 between the teeth 253 on the ratchet 250 is selected so that the worst case vertical travel through the tightening by the screw threads 234 and 236 is enough to grip the conductor 212 with sufficient force. Further in this regard, the desired relationship between the thread pitch P2 of the screw threads 234, 236, the ratchet tooth pitch P2 and the compression of the spring 226 for an embodiment wherein the first and second angular positions are separated by 210 angular degrees can be explained as follows:

---
Lead for 2 start thread = 2 × Thread Pitch (P2) = 2 × P2
→ 360° rotation = P2P = Total vertical screw travel
For 210° = (210/360) × 2 P2 of vertical travel = (7/6) × P2
Worst case tightening (screw vertical travel) =
Total screw vertical travel for 210° screw rotation
Worst case spring compression = (7/6) × P2 − P1
Worst case spring compression during downward
movement of the pin from the worst case position
as the screw is rotated clockwise = P1.

---

To remove the clamp 210 from a conductor 212, the rotatable member 230 is rotated counter-clockwise to the first angular position shown in FIG. 13 loosen the engagement of the jaws 216 and 218 with the conductor 122 and to move the tooth 252 from the engaged position to the free position. The rotatable member 230 is then forced downward against the force of the spring 226 to open up the clamp jaws 216 and 218.

It should be appreciated that while specific forms and geometries have been shown herein for the components of the specific embodiments of the clamp 210 in the illustrations, this disclosure contemplates that other forms and geometries may be utilized with the concepts disclosed herein and that the concepts disclosed herein can find use and be incorporated in any type of grounding clamp for use with overhead electrical conductors.

The invention claimed is:

1. A grounding clamp for use on an overhead electrical conductor, the grounding clamp being actuated by a user operated elongate stick or pole, the grounding clamp comprising:
   a body connectable to an electrical conductor to provide an electrically conductive connection;
   first and second jaws extending from the body and movable relative to each other between an open position wherein the overhead electrical conductor may be inserted into the clamp and a closed position wherein the overhead electrical conductor can be clamped between the jaws to provide an electrically conductive connection between the clamp and the overhead electrical conductor;
   at least one spring biasing the jaws toward the closed position, wherein the at least one spring comprises:
      a first spring operably engaged between the body and the second jaw; and
      a second spring operably engaged between a rotatable member and the second jaw; and
   a cam mechanism operably connected to at least one of the jaws to move the jaws between the open and closed positions, the cam mechanism comprising a cam surface and a cam follower, with one of the cam surface and the cam follower being carried on the body and the other of the cam surface and the cam follower being carried on the rotatable member mounted in the body for rotation about an axis relative to the cam surface.

2. The grounding clamp of claim 1 wherein the rotatable member includes a torque connection engageable by the user operated elongate stick or pole.

3. The grounding clamp of claim 1 wherein the first jaw is fixed on the body and the second jaw is moveable relative to the body.

4. The grounding clamp of claim 3 wherein the second jaw and the rotatable member are translatable relative to the body along the axis, and the rotatable member translates along the axis in response to movement of the cam follower along the cam surface.

5. The grounding clamp of claim 3 wherein the first jaw and the body are a one-piece component of the clamp.

6. The grounding clamp of claim 1 wherein the cam surface is carried on the body and the cam follower is carried on the rotatable member.

7. The grounding clamp of claim 1 wherein the cam surface defines a helical path for the cam follower centered on the axis.

8. The grounding clamp of claim 7 wherein the cam surface is defined by a helical shaped groove.

9. The grounding clamp of claim 8 wherein the groove includes opposite end portions that extend transverse to the axis, one of the end portions receiving the cam follower in the closed position and the other of the end portions receiving the cam follower in the open position.

10. The grounding clamp of claim 1 wherein the cam follower comprises a cylindrical shaped surface slidably engaged with the cam surface.

11. The grounding clamp of claim 10 wherein the cam follower comprises a cylindrical shaped post defining the cylindrical shaped surface.

12. The grounding clamp of claim 1 wherein the body further comprises a boss configured to receive an end of an electrical conduit to form an electrically conductive connection with the electrical conduit.

13. A grounding clamp for use on an overhead electrical conductor, the grounding clamp being actuated by a user operated elongate stick or pole, the grounding clamp comprising:
   a body connectable to an electrical conductor to provide an electrically conductive connection;
   first and second jaws extending from the body and movable relative to each other to allow the overhead electrical conductor to be inserted between the jaws and then clamped between the jaws to provide an electrically conductive connection between the clamp and the overhead electrical conductor;
   a tightening mechanism configured to tighten the jaws against the overhead electrical conductor in response to actuation of the tightening mechanism by a user; and
   a ratchet mechanism configured to allow the tightening mechanism to be translated relative to the body to any of a plurality of predetermined, linearly spaced, fixed positions to adjust the spacing between the jaws, wherein the ratchet mechanism comprises a ratchet fixed on one of the tightening mechanism and the body, and a tooth mounted to the other of the body and the tightening mechanism for movement between an engaged position wherein the tooth is engaged with the ratchet to fix the tightening mechanism in one of the predetermined, linearly spaced, fixed positions and a free position wherein the tooth is disengaged from the ratchet to allow the tightening mechanism to be moved from one of the predetermined, linearly spaced, fixed positions to another predetermined, linearly spaced, fixed position, wherein the ratchet is fixed to the body and the tooth is mounted to the tightening mechanism.

14. The grounding clamp of claim 13 wherein the ratchet mechanism further comprises a rotatable cam surface configured to move the tooth from the free position to the engaged position in response to actuation by a user.

* * * * *